(12) United States Patent
Rosenkranz et al.

(10) Patent No.: US 12,365,368 B2
(45) Date of Patent: Jul. 22, 2025

(54) BOGIE FOR A RAIL VEHICLE AND RAIL VEHICLE CARRIAGE HAVING AT LEAST ONE BOGIE, RAIL VEHICLE HAVING AT LEAST ONE RAIL VEHICLE CARRIAGE, AND METHOD FOR ADJUSTING THE HEIGHT OF A CARRIAGE BODY OF A RAIL VEHICLE CARRIAGE

(71) Applicant: Stadler Rail AG, Bussnang (CH)

(72) Inventors: Rolf Rosenkranz, Buch am Irchel (CH); Alberto Cortesi, Gachnang (CH); Dirk Schillings, Zihlschlacht (CH); Jesus Juan Munoz, Valencia (ES)

(73) Assignee: Stadler Rail AG, Bussnang (CH)

( * ) Notice: Subject to any disclaimer, the term of this patent is extended or adjusted under 35 U.S.C. 154(b) by 919 days.

(21) Appl. No.: 17/441,471

(22) PCT Filed: Mar. 22, 2019

(86) PCT No.: PCT/EP2019/057206
§ 371 (c)(1),
(2) Date: Sep. 21, 2021

(87) PCT Pub. No.: WO2020/192860
PCT Pub. Date: Oct. 1, 2020

(65) Prior Publication Data
US 2022/0169291 A1    Jun. 2, 2022

(51) Int. Cl.
*B61F 5/30* (2006.01)
*B61F 5/24* (2006.01)
*B61F 5/50* (2006.01)

(52) U.S. Cl.
CPC ............... *B61F 5/304* (2013.01); *B61F 5/24* (2013.01); *B61F 5/50* (2013.01)

(58) Field of Classification Search
CPC ............... B61F 5/304; B61F 5/24; B61F 5/50
See application file for complete search history.

(56) References Cited

U.S. PATENT DOCUMENTS

| 2,473,714 | A | 6/1949 | Krotz |
| 5,181,473 | A | 1/1993 | Petit et al. |
| 8,171,861 | B2 | 5/2012 | Rodet |

FOREIGN PATENT DOCUMENTS

| BE | 522 704 | 11/1955 | |
| CH | 264180 A | * 12/1946 | ................ B61F 3/08 |

(Continued)

OTHER PUBLICATIONS

Partial Search Report Corresponding to PCDT/EP2019/057206 mailed Dec. 9, 2019.

(Continued)

*Primary Examiner* — Robert J McCarry, Jr.
(74) *Attorney, Agent, or Firm* — Finch & Maloney PLLC

(57) ABSTRACT

A chassis (100), in particular a low-floor chassis, for a rail vehicle, in particular for a tram-way. The chassis (100) comprises at least four wheels (4) each having a wheel bearing, at least two wheel axles for suspending the wheels (4), a chassis frame (1) and a primary suspension for suspending the wheels (4) relative to the chassis frame (1). The primary suspension has at least four torsion bars (20). Two torsion bars (20) each, in particular two torsion bars on one side of the chassis, are connected via a connecting element (21) in such a way that the torque of the torsion bars (20) oppose each other, in particular the torques essentially cancel each other out.

17 Claims, 7 Drawing Sheets

(56) References Cited

FOREIGN PATENT DOCUMENTS

| | | |
|---|---|---|
| CH | 264 180 | 9/1949 |
| DE | 26 16 923 A1 | 10/1976 |
| DE | 2913539 A1 | 10/1980 |
| DE | 39 31 912 A1 | 4/1991 |
| EP | 0465346 A1 * | 7/1991 ............. B61F 13/00 |
| EP | 0 548 044 A1 | 6/1993 |
| EP | 0571961 A1 | 12/1993 |
| EP | 0718170 B1 | 8/1999 |
| FR | 3 049 252 A1 | 9/2017 |
| GB | 1 525 647 | 9/1978 |
| GB | 2 289 877 A | 12/1995 |

OTHER PUBLICATIONS

International Search Report Corresponding to PCT/EP2019/057206 mailed Jan. 24, 2020.
Written Opinion Corresponding to PCT/EP2019/057206 mailed Jan. 24, 2020.

* cited by examiner

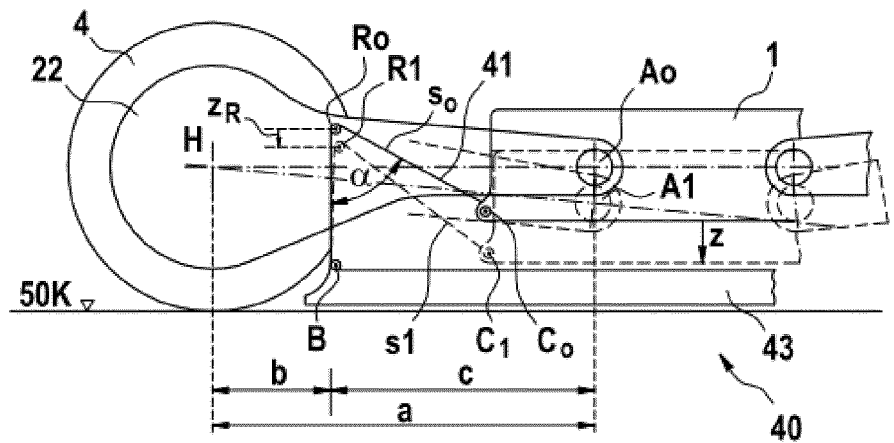
Fig. 6
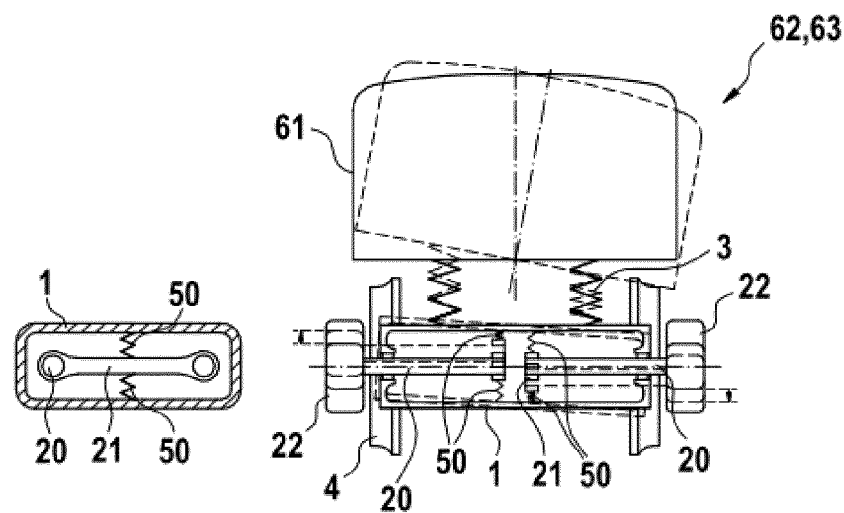
Fig. 7a
Fig. 7b

BOGIE FOR A RAIL VEHICLE AND RAIL VEHICLE CARRIAGE HAVING AT LEAST ONE BOGIE, RAIL VEHICLE HAVING AT LEAST ONE RAIL VEHICLE CARRIAGE, AND METHOD FOR ADJUSTING THE HEIGHT OF A CARRIAGE BODY OF A RAIL VEHICLE CARRIAGE

The present invention relates to a chassis for a rail vehicle, as well as a rail vehicle car with at least one chassis, a rail vehicle with at least one rail vehicle car and a method for height adjustment of a car body.

Chassis of rail vehicles support one or more pairs of wheels opposite the car body. The term chassis covers rotating bogies, in which pairs of wheels are mounted in a frame that can rotate relative to the car body, and non-rotating chassis attached to the car body. Special challenges are presented by bogies for low-floor rail vehicles: because of the low floor height inside the car body, the chassis must not exceed a certain height, especially in the area between the wheels.

From EP 0 548 044 a cradleless low-floor bogie with a bogie frame and two wheel sets is known, where in a driven bogie the wheels comprise wheel hub motors on the outside. The bogie structure is complex, expensive and costly to maintain.

Also known from U.S. Pat. No. 2,473,714 is a bogie in which individual wheels are mounted on torsion bars via rockers. Due to the arrangement of the primary spring system, the disclosed bogie is not suitable for low-floor bogies. In addition, high torsional moments are introduced into the bogie frame.

A bogie with torsion bar suspension as primary suspension and mounting of the wheels on rockers is known from CH 264 180. The bogie also has a complex structure.

Another disadvantage of the prior art is that driven bogies in particular do not allow a continuous, wide low-floor area because the available space in the area of the car body is limited. In addition, when torsion bars are fixed directly to the chassis frame, high forces and moments are introduced directly into the frame, so that the frame has to be correspondingly stable and thus complex and heavy.

The object of the present invention is to overcome these and other disadvantages of the prior art and, in particular, to provide a chassis of simple and stable design which permits a continuous low-floor area and a large aisle width, in particular also above a motorized chassis, and which can be flexibly adapted to different track gauges and areas of application. The chassis should also be usable as a chassis with largely the same basic concept without significant cost and functional disadvantages.

This object is solved by a chassis for a rail vehicle, as well as a rail vehicle car with at least one chassis, a rail vehicle with at least one rail vehicle car and in methods for height adjustment of a car body of a rail vehicle car according to the independent claims.

In particular, the object is solved by a chassis, in particular a low-floor chassis, for a rail vehicle, in particular for a streetcar. The chassis comprises at least four wheels each with a wheel bearing, at least two wheel axles for suspending the wheels, a chassis frame and a primary suspension for suspending the wheels relative to the chassis frame. The primary suspension has at least four torsion bars. Each torsion bar is extended along a geometric bar axis. The chassis comprises at least two connecting elements. Two torsion bars in each case, in particular two torsion bars on one side of the chassis, are connected via a connecting element in such a way that the torques of the torsion bars introduced into the connecting element are in opposite directions, in particular the torques essentially cancel each other out.

Such a chassis enables a continuous or substantially continuous low-floor area as well as a wide aisle width in the chassis area. Further, a simple spring-riding is possible. The connection of the torsion bars results in balanced wheel loads even when driving over uneven surfaces. As a result, derailment safety is greater and structural stresses on the chassis frame are lower.

The connecting elements are preferably not rigidly connected to the chassis frame, in particular they are not part of the chassis frame. In this way, torques are not introduced into the chassis frame, or only to a limited extent.

The chassis frame is designed as a substantially box-shaped component and may be divided into different compartments by partition walls. Some or all of the compartments may comprise a floor. The compartments may have openings.

As used herein, the term axle means a rotating or non-rotating physical device extending in a longitudinal direction for mounting the wheels. A geometric axis, on the other hand, is understood to mean the ideal axis of rotation of an object. Wheels may have a co-rotating wheel axle (in the case of independent wheel suspension, only a very short one) with which they are mounted on other components. Alternatively, stationary (non-rotating) wheel axles are also possible, especially in the case of independent wheel suspensions. The term wheel bearing refers to the bearing between the wheel axle and the component supporting it; in the case of upright axles, the term is to be interpreted analogously and generally refers to the bearing between the rotating wheel and the upright axle. Wheel axles can be of multi-part design and carry one or two wheels.

A wheel pair is defined as two wheels with essentially aligned geometric wheel axles, e.g. the two wheels arranged at the front or rear of the chassis in the direction of travel.

The wheel suspensions may be designed as wheel sets, portal or independent wheel axles, or as independent wheel suspensions. A wheel set is a device in which the two wheels are fixed in rotation on a common wheel axle. A single wheel or portal axle is a wheel axle in which the wheels are mounted on a non-rotating structure. For the purposes of the invention, portal axles are all axle variants with non-coaxial transverse connection, for example cranked portal axles. Thus, a lowered floor in the area of the axle is possible. The wheel axles of the wheels are mounted on both sides in the non-rotating structure. Alternatively, the wheels here can also be mounted directly on the non-rotating structure without their own wheel axle. In the case of independent wheel suspension, each wheel also has its own wheel axle, but these are not directly connected to each other.

The chassis can comprise at least one motor to drive the chassis. This allows the chassis to be easily driven.

The connecting element can be made of high-strength material such as quenched and tempered steel, e.g. 34CrMo4. Such a material exhibits particularly high strength. The connecting element can be forged. This allows a space-saving solution.

The chassis can be designed for narrow gauge, standard gauge, broad gauge or meter gauge. This allows the chassis to be used for a wide range of applications while retaining the same components, in particular the same chassis frame.

Preferably, the chassis comprises four rockers. One rocker each is mounted on the chassis frame via a torsion bar, preferably exclusively via a torsion bar.

This allows simple mounting of the primary suspension and simple construction of a low-floor chassis. Preferably, the geometric bar axes of the torsion bars are arranged essentially parallel to the wheel axles. This allows a simple arrangement of the torsion bars and a simple torque transmission.

Preferably, the torsion bars are mounted movably, in particular with an elatic bearing, on the chassis frame. In particular, the torsion bars are mounted so that they can be displaced along the geometric bar axis by essentially +/−5 mm.

In this way, transverse shocks to the wheels can be at least partially absorbed, and separate suspension between the wheel and the torsion bar bearing is unnecessary.

The object is further solved by a chassis for a rail vehicle, in particular a chassis as described above. The chassis comprises a chassis frame, at least one, preferably two, portal axles and at least one damping system for damping movements between the chassis frame and the wheel axle. The damping system comprises at least one damping element and at least one, preferably two, motion transmission elements for transmitting a vertical deflection movement of the chassis frame. The transmission element is arranged with one end at a motion transmission point on the portal axle. The damping element is arranged between the portal axle and the chassis frame and with one end on the portal axle at a damping connection point. The damping element is arranged in particular so that the damping direction is parallel to the direction of travel. The portal axle is designed to pivot away from the chassis frame. A distance between the damping connection point and the geometric wheel axle is greater than the distance between the motion transmission point and the geometric wheel axle.

Such a damping system has a low overall height and thus allows a simple construction of a low-floor chassis. Such a damper system also permits a simple increase in the damper stroke that can be adapted to the compression of the primary suspension: the portal axle is deflected so that the distance between the chassis frame and the portal axle is increased. The stroke length of the damper element and thus the spring travel increases accordingly.

In particular, each portal axle comprises two side parts and a bridge girder arranged between the side parts, the side parts and bridge girder being arranged between the wheels. Each side part includes a portal axle bearing. At least one motion transmission element is arranged at a motion transmission distance from the geometric axis of the portal axle bearing on a side part, so that the bridge girder can be rotated about the geometric axis of the portal axle bearing when the chassis frame is vertically deflected.

This enables an easy-to-maintain, space-saving and inexpensive damping system with large stroke movements and small vertical spring deflection. The damping element thus exhibits a stroke increased by a factor when the primary suspension is deflected by z. The factor depends on the selected geometry. The damping element can be arranged on the bridge girder.

Preferably, the chassis comprises at least two support elements for direct connection to a car body. In particular, the support elements comprise curved guides, slewing ring segments, preferably with sliding elements, and/or rollers, in particular cylindrical or tapered rollers.

This allows a simple construction of a rail vehicle with a low floor height. The support elements can have a support plane for contact with a corresponding segment on the car body. This allows easy connection to the car body.

The slewing ring segments can be equipped with bearings with rolling elements, preferably circumferential rolling elements.

As high-precision guide elements—similar to bearings—curved guides are very demanding in terms of correct bearing conditions. Even slight geometrical deviations between the support planes or radii of the segments lead to impermissible gimbal and/or transverse loads on the guides due to the high rigidity of the components in the case of the tolerance deviations occurring in vehicle construction. For this reason, elastic elements can be formed between the support element and the chassis. These are designed to withstand the loads occurring during operation (vertical imposed load, transverse load, etc.) and to generate only small cardanic moments in the event of angular deviations of the support planes. The same applies to any transverse deviations.

In the embodiment of the support elements with rollers, the rollers are preferably mounted in a structure arranged above a secondary suspension in the chassis frame so that a weighing box can roll on the rollers.

This avoids interference with the low-floor passage area by a slewing ring and eliminates the crossmember (cradle) between the slewing ring and the chassis frame that is usually required for supporting the slewing ring, thus creating the clearance for continuous low-floor passage and also enabling considerable weight savings.

Such a chassis has a very low overall height and thus results in a simple rail vehicle structure and a simple power flow via the support elements.

Preferably, the chassis comprises a secondary suspension. In particular, this secondary suspension comprises a coil spring, an air spring and/or a rubber spring. This improves ride comfort. Preferably, the chassis comprises at least two, preferably four, spring elements for roll stiffening, in particular roll springs. The spring elements are in particular preferably arranged between the chassis frame and the connecting elements, so that the chassis frame is at least partially supported on the connecting elements. The arrangement of the spring elements means that roll stiffening can be implemented in a simple manner via the primary suspension.

Rolling is generally understood to mean a lateral inclination of the car body with respect to the direction of travel. The swaying car body is supported on the chassis frame by the secondary suspension. As a result, the chassis frame tilts and the spring elements at least partially absorb the movement of the car body.

Preferably, the spring elements comprise elastomers such as chloroprene or other plastics such as polyurethane. This allows for a low-cost yet stable suspension system. The spring elements may include metal inserts.

The spring elements may be progressive and/or include a gap for free play. This increases ride comfort because at low loads, the spring action is relatively soft and/or the spring elements do not compress until the chassis is at a certain angle. When a large load is applied, the spring action is nevertheless hard. The spring elements are preferably arranged centrally on the connecting element. If the car body tilts to one side, the spring elements arranged below the connecting element are loaded on the tilting side and those on the lifting side are relieved. This generates a restoring force that counteracts the swaying.

If the spring elements are arranged off-center (e.g. above the torsion bars instead of in the center of the connecting element), stiffening against pitching movements can also be achieved if required. Pitching movements are tilting movements of the car body in the direction of travel.

According to a further aspect of the invention, the problem is further solved by a chassis for a rail vehicle, in particular a chassis as previously described. The chassis comprises a chassis frame, four wheels each having wheel bearings and four rockers. At least one rocker, preferably two, in particular preferably four, rockers, connects a wheel axle to a drive axle. The wheels each comprise an inner side and an outer side. The chassis comprises an inner area between the inner sides of the wheels and an outer area outside the inner side of the wheels. The rockers are each located in the outer region of the chassis. Each wheel is mounted via a wheel axle in at least one wheel bearings in each case. In each case at least one wheel bearing is arranged in or on the respective rocker and at least one wheel bearing is at the same time the transmission bearing.

This enables a simple design of a driven chassis, since a separate transmission shaft bearing, which is usually necessary, and also the clutch, which is usually necessary, for absorbing relative movements between the wheel and the rocker are unnecessary. Furthermore, a rail vehicle with a continuous low-floor is made possible. Such a chassis also allows large aisle widths in the chassis area.

The wheels can be supported exclusively by the rockers. This allows a simple and compact design of the chassis.

A wheel bearing can comprise one or more rolling bearings. This allows simple mounting of the wheels.

A rocker forms at least part of the connection between a wheel and the chassis frame and is movable relative to the frame. The wheel suspensions can be designed as wheel sets, portal or independent wheel axles or as independent wheel suspensions. A wheel set allows two wheels to be driven in a simple manner with one motor and one transmission. Single wheel axles allow single wheel drives to be used.

Portal axles allow a simple and compact design of the chassis and a rail vehicle with a continuous or substantially continuous low-floor floor. Such a chassis also allows large aisle widths in the undercarriage area.

Preferably, the wheels are supported exclusively by one rocker and one torsion bar each and are preferably connected by portal axles.

This allows simple and efficient mounting of the wheels. This eliminates the need for a separate suspension between the rocker attached to the torsion bar and the wheel axle. Accordingly, the wheel axle is mounted directly in the rocker.

Preferably, the chassis comprises at least one, preferably two, more preferably four, transmissions. Each transmission is arranged on a respective rocker, preferably integrated in the rocker. This permits a space-saving design. The transmission can be mounted on the rocker for this purpose. If the transmission is integrated in the rocker, the rocker essentially also serves as the transmission housing. This arrangement therefore saves material and weight.

Preferably, the chassis comprises adjusting means for adjusting the distance between the wheel axle and the chassis frame. The adjusting means preferably allow the position of the rockers relative to the chassis frame to be changed, in particular increased or decreased.

This makes it easy to change the body height in accordance with wheel wear. Such adjustment means allow simple compensation for wheel wear.

Preferably, the rockers are made in two parts and a first part is adjustable in position relative to a second part. The first part comprises the bearing connected to the chassis frame, and the second part comprises the bearing connected to the wheel. In particular, the parts are provided with fixing and/or latching elements.

This allows easy adjustment of the height of the car body via the top of the rail without the need for inserting shims or similar means, which has been common practice in the past.

The fixing elements can comprise slotted holes and/or screws. The latching elements may comprise replaceable fittings. The latching elements have fixing positions. The fixing positions allow the positions of the rockers to be varied discretely, in particular such that a vertical distance between the wheel axles and the chassis frame can be varied by 10 mm in each case. The latching elements may comprise slotted holes and/or screws. These latching elements are designed in such a way that the position of the swing arm axle can be adjusted relative to the wheel axle.

Alternatively, the position of the torsion bars can be adjusted by the adjustment means. In particular, the angular position of the torsion bars relative to the chassis frame is adjustable. In particular, the angular position of the torsion bars relative to the connecting element is adjustable. Thus, the structure of the adjustment device is simple and effective.

In particular, at least one connecting element comprises a bridge and adjustment means. The adjusting means comprise at least two levers, wherein for adjusting the angular position of the torsion bars the support point of the levers on the bridge is displaceable in vertical direction. In particular, the support point is displaceable by turning at least one eccentrics connected to the levers.

This allows easy adjustment of the height of the car body.

The adjustment means may therefore comprise eccentrics and two levers. The eccentrics and one levers connected to each torsion bar can be arranged on the bridge. The torsion bars can be rotatably mounted in the bridge.

The adjustment device is ultimately used to easily change the height of the car body above the top of the rail: When the eccentrics are rotated, the levers are moved and the angular positions of the torsion bars are changed relative to each other and relative to the chassis frame. All torques are absorbed by the levers. This changes the position of the rockers and thus the height of the body support above the rail top edge.

Preferably, the chassis comprises at least one, in particular two, stiffening elements, in particular hollow beams, for stiffening against a rotational movement of the rockers. Each rocker comprises an extension element for extending the rocker. The extension elements of the rockers on one side of the chassis are each connected or connectable via a stiffening element, so that the rotational movements of the rockers about the geometric wheel axles can be at least partially cushioned. In particular, the connections between the stiffening element and the rockers each comprise a distance so that the rotational movements of the rockers about the geometric wheel axles can only be cushioned by the stiffening element once the chassis is subjected to a predetermined load.

In this way, primary suspension is simple and safe: In the event of a break in the primary suspension, this arrangement of the stiffening element prevents the wheel affected by the break from becoming approximately loadless and thus protects against derailment when cornering. The load on the chassis is understood here to be the forces acting on a chassis as a result of the loading of a vehicle, so that the primary suspension is displaced by a vertical spring travel. At low loads, the rockers rotate slightly and only the primary suspension acts. Above a certain load on the chassis, the rotational movements of the rockers become so great that the distance is overcome and the stiffening element cushions the rotational movements.

The extension element can be part of a rocker, in particular the rocker housing or transmission mount, or an element attached to the rocker.

Thus, progressive suspension can be achieved, i.e., soft suspension at low loads and hard suspension at high loads. As a result, when the vehicle is lightly loaded, comparatively high comfort is achieved by the soft spring. When the vehicle is too heavily loaded, hard springs prevent unacceptably large spring deflections. Alternatively, rubber angle springs such as chevron springs or additional spring elements such as buffers can be used, which take effect from a defined spring travel.

One or more spring elements can be arranged in the distance between the stiffening element and the rockers. This makes it easy to achieve the desired suspension.

The stiffening element can be connected and/or connectable to an extension element via a support member and/or a support element in each case. In particular, the support member and/or the support element comprises an elastomeric material, in particular polyurethane.

This enables progressive suspension in a simple manner without additional loading of the chassis frame and the torsion bars.

Preferably, the stiffening elements each comprise at least one support member for resting on an extension element and a support element for supporting an extension element. In particular, from a predetermined load on the chassis, at least one extension element is connected to the stiffening element via the support member and the support element. In particular, each stiffening element is arranged on the extension elements in such a way that at a load smaller than the predetermined load, the stiffening element rests on the extension elements and at a load equal to or greater than the predetermined load, there is a second point of contact between the stiffening element and each extension element so that the extension elements are wedged in the stiffening element.

This allows for a simple and space-saving construction of a chassis.

The stiffening element can be designed as a hollow body, in particular tubular, preferably with a rectangular cross-section. In the event of a crash, the stiffening element can be at least partially plastically deformable. On the other hand, dynamically induced force peaks in the event of a crash are mitigated and limited to the extent corresponding to the yield strength of the material used.

Preferably, the chassis comprises at least one, preferably two, more preferably four, motors. The motor or motors are arranged in the interior, preferably each comprising a drive shaft arranged parallel to the wheel axle.

In this way, the chassis can be constructed simply and compactly. If the drive shafts are parallel to the wheel axles, simple torque transmission is possible. Each motors drives at least one wheel via a transmission, whereby each wheel can be mounted on a rocker. The transmission can be designed as a spur chassis unit. Spur chassis have a simple design, are robust and have a high efficiency.

In particular, the motors are arranged on the outer surfaces of the chassis frame and/or attached to the outer surfaces of the chassis frame. This allows a compact design of the chassis.

If there is a lack of space, e.g. in an embodiment of a narrow-gauge chassis, only one motor can be arranged per side surface, i.e. a total of two motors per chassis.

Narrow-gauge railroads are thus easy to manufacture and still have sufficient power from driven chassis.

Each motor is preferably connected to the gearbox input shaft via at least one compensating clutch. This allows easy transmission of power from the motor to the transmission. The compensating clutch is designed in particular to permit radial axle offset: When the primary suspension described above is used via torsion bars acting on the rocker, a slight vertical and lateral offset of the engine axle relative to the transmission input shaft occurs when the primary suspension is compressed, which is made possible by the aforementioned compensating clutch, in particular an arc-number clutch. This enables flexible power transmission. The transmission output axle is also the wheel axle. The corresponding transmission bearing serves as the wheel bearing. This enables a simple and space-saving design of a driven chassis, since fewer support elements have to be used for the mounting of wheels and transmission, and a low-floor area above the inner area of the chassis is also possible with driven chassis.

The wheel axle can be of multi-part design, in particular comprising an adapter screwed onto the wheel.

Preferably, each motors, in particular the motor housing, has a cross-sectional diameter of less than 200 mm. The cross-sectional diameter refers to the diameter of the entire motors including the housing. In particular, each motors has a power between 45 and 60 kW. The motors can have speeds of 10-12 kU/min. Such motors enable a low-height chassis structure in which the motors are arranged below the low-floor area, thus enabling a simple structure of low-floor rail vehicles.

Preferably, each two motors are connectable or connected with a clutch. In particular, two motors each are connectable or connected to a releasable or rigid clutch, preferably to a passive clutch, more preferably to a centrifugal clutch.

For this purpose, two motors in each case are arranged in such a way that their shafts can be connected between the motors and are coupled in each case on the side opposite the connection to one wheel in each case via the rocker. Preferably, two motors associated with each pair of wheels can be coupled. For this purpose, the motor axes of the motors to be coupled are aligned.

A rigid clutch of the motors allows sinusoidal running, but leads to high torques in the driveline when negotiating tight curves and to increased wheel slip. The passive clutch preferably acts in such a way that it disengages at low speeds, thus permitting constraint-free cornering. At high speeds, the clutch closes, thus improving straight-line stability. However, the clutch allows slipping at high torque differences. A centrifugal force-based slipping clutch, for example, can therefore be considered as a clutch. The clutches can be implemented separately as independent clutches or as a single unit.

In particular, the task is solved by a chassis for a rail vehicle, in particular a chassis as previously described. The chassis comprises at least one, preferably two magnetic rail brakes. In particular, the magnetic rail brake is attached to the rocker via a cable.

Magnetic rail brakes on streetcar vehicles are usually held about 10 mm above the rail top edge by preloaded springs. This distance must be maintained under all operating conditions, e.g. even when the vehicle is deflected in or out. On the one hand, this is to prevent the brake shoe from rubbing on the rails during non-braking operation. Secondly, the distance to the rail should be small: If the distance between the brake shoe and the rail is too great, the magnetic field generated will not be sufficient to overcome the spring forces. The force of the pretensioned suspension springs must also be overcome.

As standard, the brake shoes are attached to a carrier connected to the two axle bearing housings, so that inward and outward spring deflections of the chassis frame have no influence on the distance between brake shoe and rail.

In low-floor bogies, the necessary space for installation of this support structure is often not available or compromises are required for its installation.

Preferably, the magnetic rail brake comprises a brake shoe, a cable and a pulley. The cable is attached to a frame attachment point of the chassis frame and to a brake attachment point of the brake shoe. Between the frame attachment point and the brake attachment point, the cable is guided via the deflection pulley. This allows easy adjustment of the distance of the magnetic rail brake above the rail.

The deflection pulley can be attached to a rocker at a horizontal distance c from the geometric rocker axis. The horizontal distance c may be approximately ⅔ of the horizontal distance a between the geometric swingarm axis and the wheel axle. The cable may include a first cable section and a second cable section. The first rope section may be disposed between the brake attachment point and the idler pulley. The first rope section may be arranged substantially vertically. The second rope section may be arranged between the deflection pulley and the frame attachment point at an angle α of substantially 60° from vertical.

In this way, the attachment of the magnetic rail brakes can be attached in a space-saving and simple manner: With this suitable choice of the geometry of the deflection, in particular the position of the deflection roller on the rocker, the frame attachment point and the brake attachment point, the deflection of the primary suspension can thus be easily compensated and a constant distance between the rail and the magnetic rail brake can be easily maintained: the rocker changes its position slightly, whereby the height of the magnetic rail brake above the rail is adjusted via the cable. Preferably, in this type of magnetic rail brake, the distances a and c and the angle α are selected so that when the frame mounting point is moved vertically by a frame displacement z, the vertical distance between the wheel axle and the brake mounting point does not change or changes only slightly.

The task is further solved by a chassis for a rail vehicle, preferably a chassis for a broad-gauge railroad, preferably by a chassis as previously described. The chassis comprises at least one wheelset with a track gauge W. Each wheel comprises a running surface on its circumference. The wheels of a wheelset are arranged in particular on a standard gauge axle. The wheels of a wheelset are each arranged at an average fastening distance from one another. The mean fastening distance is in particular between 1200 mm and 1600 mm, in particular substantially 1540 mm The running surfaces of the wheels are offset away from the inner region towards the outside in such a way that the track width is greater than the mean fastening distance by at least 20 mm, in particular by at least 42 mm. The track gauge is preferably between 1400 mm and 1676 mm so that the chassis can be used for a broad-gauge railroad.

This makes it easy to convert a standard-gauge bogie to a broad-gauge bogie by replacing the wheels only. The wheels have an inner wheel face, an outer wheel face, wheel flanges and wheel hubs. A wheel for a rail vehicle comprises a running surface and a wheel flange as well as two wheel sides. The wheel side to which the flange is closest is the inner wheel side. The side of the wheel closest to the running surfaces is the outside of the wheel. The wheel end faces and the wheel hub planes are located on the wheel sides.

The wheel hubs are extended along the geometric wheel axles from the inner side of the wheel to the outer side of the wheel. The wheel hub thus comprises an inner wheel hub plane and an outer wheel hub plane.

The distance from the midpoint between the inner and outer wheel hub planes of a first wheel to the midpoint between the inner and outer wheel hub planes of a second wheel is the mean attachment distance. The distance between the wheel flanges is the track width W.

Further, the problem is solved by a wheel for a chassis, in particular for a chassis as previously described. The wheel comprises at the circumference a wheel rim or a wheel tire with an inner and an outer wheel end face, a wheel hub, a wheel axle, an inner wheel face and an outer wheel face. The wheel rim or wheel tire width is between 110 mm and 150 mm. The wheel hub is extended along the geometric wheel axle. The wheel hub includes an outer wheel hub plane on the outside of the wheel. The wheel rim or wheel tire is offset outwardly away from the inner side of the wheel such that the wheel has a distance of at least 12 mm, in particular at least 21 mm, between the outer wheel end face and the outer wheel hub plane.

Such a wheel permits simple conversion of a chassis from standard gauge to broad gauge.

The task is further solved by a method for converting a chassis from a standard-gauge chassis to a wide-gauge chassis. In a first step, a standard-gauge bogie with standard-gauge wheels is provided. In a second step, the standard gauge wheels are replaced with wheels as previously described.

In this way, a chassis can be easily converted from a standard-gauge chassis to a broad-gauge chassis. Alternatively, a standard gauge undercarriage without wheels is provided in a first step and wheels are fitted to it in a second step as previously described.

This process permits simple manufacture of a broad-gauge chassis.

Furthermore, the problem is solved by a rail vehicle car. The rail vehicle car comprises at least one, in particular two, chassis as previously described.

Such a rail vehicle car has a simple structure and has an essentially continuous low-floor area (possibly with the exception of the recesses for the wheels), whereby large aisle widths in the chassis area can be realized even with turning-out chassis and in meter gauge applications.

The car body of the rail vehicle car can be directly connected or connectable to bearing elements of the chassis. This reduces the distance between the car body and the wheel axles and enables a continuous low-floor rail vehicle car, since no cradle is required.

The task is further solved by a rail vehicle. The rail vehicle comprises at least one, preferably at least two rail vehicle cars as described above.

It may be a multi-articulated rail vehicle in which sedan chairs are carried between carriages which have a non-rotating chassis as previously described, or conventional rail vehicles comprising at least one carriage with, in particular, two rotating chassis as previously described.

The task is further solved by a method for height adjustment of a car body of a rail vehicle car, preferably a rail vehicle car as previously described. Adjustment means are used to change the position of rockers and/or parts of rockers so that the vertical distance between wheel axles and the car body is changed, in particular in steps of 10 mm.

Such a method allows easy adjustment of the car body height via rail top edge to compensate for wheel wear.

The task is further solved by a method for adjusting the height of a car body of a rail vehicle car, in particular a rail vehicle car as described above. The position of the primary suspension of the chassis is changed, in particular the position of at least four torsion bars, whereby the distance between the wheel axle and the chassis frame is changed. In particular, the distance is changed in steps of 10 mm.

The invention is explained by way of example with reference to the following figures. It shows FIG. 1: A chassis in perspective view FIG. 2: A side view of the chassis from FIG. 1

FIG. 3: A top view of the chassis from FIG. 1

FIG. 4: Schematic view of a connecting element with an adjustment device

FIG. 5: Schematic side view of an alternative adjustment device

FIG. 6: Schematic side view of an attachment of a magnetic rail brake

FIGS. 7a and 7b: Schematic views of a roll stiffener of the chassis

FIG. 8: Top view of one side of the chassis

FIGS. 9a and 9b: Schematic view of a rail vehicle with chassis

FIGS. 10a and 10b: Part of a sectional view of a chassis with damping system and schematic view of a damping system FIG. 11: Part of a sectional view through a stiffening element in longitudinal direction FIGS. 12a and 12b: Section through a stiffening element in longitudinal direction FIG. 1 shows a chassis 100 in perspective view. The chassis 100 comprises a chassis frame 1 on which four wheels 4 are mounted via a rocker 22 and a torsion bar 20 in each case. The torsion bars 20 thus form the primary suspension of the chassis 100. The wheel axles 25 are mounted on wheel bearings (indicated schematically by 24). The wheel bearings 24 are each arranged in a rocker 22. Two wheels are each connected by a portal axle 8. Also connected to the chassis frame 1 are secondary suspensions not shown, dampers not shown and two support elements 12 for mounting a car body 61 (see FIG. 7b). Furthermore, the chassis 100 comprises four brakes 42 (cf. FIG. 3). In addition, the chassis 100 may comprise magnetic rail brakes 40 (cf. FIG. 6). In the direction of travel, the chassis 100 comprises a left chassis side and a right chassis side. The chassis sides are substantially mirror images of each other.

The chassis frame 1 is substantially box-shaped and divided into three compartments. The chassis frame 1 may be made of mild steel or cast iron.

The wheels 4 comprise an inner side on the side of the inner wheel end face 5, and an outer side on the side of the outer wheel end face 6. Between the inner wheel end faces 5 of the wheels 4 lies the inner area of the chassis 100, and outside lies the outer area of the chassis 100. The rockers 22 are arranged in the outer area. One rocker 22 is arranged per wheel 4.

Two torsion bars 20 on each side of the chassis are connected to each other by a connecting element 21 so that the torques acting on the torsion bars 20 via the rockers 22 when the chassis 100 is loaded vertically are in opposite directions. As a result, the torques at least partially cancel each other out and the forces introduced into the chassis frame 1 are smaller than in conventional chassis. The rockers 22 and thus the wheels 4 are mounted only on the chassis frame 1; there is no further support, e.g. with coil springs, against the chassis frame 1 or a car body, as was previously the case.

FIG. 2 shows a side view of a chassis 100. The rockers 22 are mounted on the chassis frame 1 via the torsion bars 20. The wheel axles 25 are mounted on the rockers 22 via the wheel bearings 24 (see FIG. 1).

The rockers 22 are made in two parts. Each rocker 22 comprises a first part 22a and a second part 22b. The first part 22a comprises the frame-side rocker bearing and the second part 22b comprises the wheel-side rocker bearing.

FIG. 3 shows a top view of the chassis 100. FIG. 3 also shows a section through a torsion bar bearing 20 and through a portion of a rocker 22.

The four torsion bars 20 and the two connecting elements 21 as well as a bearing element 12 designed as a slewing ring segment can be seen. An alternative bearing element 12' in the design as a single roller mounted in the chassis is shown dashed. Multiple rollers 12' may also be provided on each side of the chassis. Of course, the analogous bearing element is also formed on the opposite side of the chassis, but it is not shown here.

Two torsion bars 20 are connected to each other via a connecting element 21 in such a way that the torques in the connecting element 21 are in opposite directions. Thus, mainly vertical, transverse and longitudinal forces act on the chassis frame 1. Moments that occur during deflection of the torsion bars 20 are not introduced into the chassis frame 1, or only to a small extent.

The torsion bars 20 and the connecting element 21 are part of the primary suspension. In a sectional view, the bearing of a torsion bar 20 can be seen. The torsion bar 20 is mounted in the chassis frame 1 via an elatic bearing 23. The elatic bearing 23 permits axial and radial displacement of the torsion bar 20 of +/−5 mm and also permits limited rotation of the torsion bar 20. The other torsion bars 20 are also mounted via such an elatic bearing 23 (not shown here).

Further shown in a partial section is a rocker 22 in which a transmission 30 is arranged. The output gear of the transmission 30 is mounted on the wheel axle 25. Each wheel bearing 24 is also a transmission bearing (not shown here). Thus, wheel axle 25 is also the transmission output shaft and is supported by wheel bearings 24.

Two brakes 42 are arranged on each wheel axle 25 and attached to the rocker 22 and act on the wheel axles 25.

The support element 12 is arranged on the chassis frame 1 between the running surfaces 7 of the wheels 4 lying one behind the other in the direction of travel and can be connected directly to the car body 61 of a rail vehicle car 62; 63 (cf. FIGS. 9a and 9b). A support element 12 comprises a part-circular guide segment bent in the direction of the outer area.

Further shown are four motors 10 connected to the chassis frame 1. The motors 10 are arranged on the inside of the chassis 100 and are attached to the outer surfaces 2 of the chassis frame 1 facing in and against the direction of travel. The geometric motor axes are thereby substantially parallel to the outer surfaces 2. The motors 10 with motor housing have a cross-sectional diameter of less than 200 mm and a power of 50 kW, 10-12 kU/min at 80 km/h. The gear ratio is approximately 14:1. The motors 10 each drive the wheels 4 of the chassis 100 via a transmission 30.

The connecting element 21 includes a bridge 30 and an adjusting device. A partial section of the chassis frame 1 and two torsion bars 20 connected via the bridge 30 are shown. The adjustment device is arranged on the torsion bars 20. The adjustment device comprises adjustment means, in this case eccentrics 32 and two levers 31. On the bridge 30, eccentrics 32 and one lever 31 each, which is connected to a torsion bar in a rotationally fixed manner, are arranged. The torsion bars 20 are rotatably mounted in the bridge 30. The adjustment device is ultimately used to change the height of the car body above the top of the rail: When eccentrics 32 are rotated, levers 31 are moved and the angular positions of torsion bars 20 are changed relative to each other and relative to the chassis frame 1. This changes the position of the rockers 22 (cf. FIG. 1) and thus the height of the body support above the top of the rail. The levers 31 are designed to absorb the moments generated during the transmission. In particular, the levers 31 are therefore of more solid construction than shown. FIG. 5 shows a schematic side view of an alternative adjustment device.

Here, the adjusting device comprises a rocker 22, adjusting elements 34 and latching elements 35. The rocker 22 is divided into a frame portion 22a on the chassis frame side and a wheel portion 22b on the wheel side. Adjusting elements 34 and latching elements 35 are arranged on the rocker 22. The positions of frame portion 22a and wheel portion 22b can be adjusted relative to one another and fixed in various positions by adjusting elements 34 and latching elements 35. The adjusting elements 34 here comprise elongated holes and screws. The latching elements 35 are in the form of a latching lug and a mating latching piece attached to the wheel portion 22b. The mating detent piece has a fixed detent position. The adjustment can be made either by loosening the adjusting elements 34 and moving the frame portion 22a and the wheel portion 22b towards each other and/or by inserting a mating latching piece with a different latching position or by changing the position of the mating latching piece.

FIG. 6 shows a schematic side view of a magnetic rail brake 40. With extended lines the position of wheel 4, rocker 22 and chassis frame 1 in a first loading condition is shown. The indicated dashed lines show the position of the components in a second loading condition, in which the chassis frame 1 is deflected by the vertical frame displacement z.

The magnetic rail brake 40 includes a brake shoe 43, a cable 41 and a pulley Ro. The cable 41 is attached at one end to the brake shoe 43 at brake attachment point B and at the other end to the chassis frame 1 at frame attachment point C. The geometric wheel axle H is arranged from the geometric swing arm axis A in a horizontal swing arm length a. The pulley Ro is arranged a horizontal swing arm length c away from the geometric swing arm axis A. In a first cable section, the cable 41 leads vertically from the brake attachment point B to a deflection pulley Ro attached to the rocker 22. In a second cable section, the cable 41 leads away from the deflection pulley Ro at an angle α from the first cable section to the frame attachment point C on the chassis frame 1. The second cable section has the initial length so in the unsprung position and the length s1 in the sprung position.

In the deflected state, the position of the geometric swingarm axis A shifts from the initial position Ao to the deflected position A1:

Under the vertical deflection of the chassis frame 1, the vertical frame displacement z, the rocker 22 rotates about the geometric rocker axis A in the initial position Ao to the deflected position A1. The deflection roller Ro moves to the position R1, resulting in the vertical roller displacement zR. A horizontal distance c between the deflection roller Ro and the geometric swing arm axis A of c=⅔ of the swing arm length a results in a vertical roller displacement zR≈⅓ z. The angle α of the second rope section is now selected in such a way that the change in length s=s1−so in the rope section between the deflection roller Ro and frame attachment point C caused by the vertical deflection is equal to the roller displacement zR. This means that the height of the brake shoe 43 (at brake attachment point B) remains constant relative to the upper edge of the rail even when the vehicle is deflected in or out. With the dimensions shown, this is achieved with an angular position of the rope section between the deflection pulley Ro and frame attachment point C of α≈60° to the vertical.

FIGS. 7a and 7b show schematic views of a roll stiffener of the chassis frame 100: FIG. 7a shows a sectional view through the chassis frame 1 in the direction of travel, FIG. 7b shows a sectional view through a rail vehicle car 62; 63 transverse to the direction of travel (cf. FIGS. 9a and 9b). The solid lines show the position of the wheels 4, rockers 22, torsion bars 20, the chassis frame 1 and the car body 61 in a first state. The dashed lines show the position of these elements in a tilted position of the car body 61.

FIG. 7a shows two torsion bars 20, a connecting element 21 and two spring elements 50. The torsion bars 20 are connected via a connecting element 21 and connected to the chassis frame 1 via elatic bearings 23 (see FIG. 3). The spring elements 50 are arranged between the chassis frame 1 and the connecting element 21. One spring element 50 each is arranged above and below the connecting element 21 in a driving position of the rail vehicle and is connected to the chassis frame 1.

FIG. 7b shows a car body 61, two wheels 4, the secondary suspension 3, two torsion bars 20 and four spring elements 50.

The car body 61 is connected to the chassis frame 1 via the secondary suspension 3. The wheels 4 are mounted on the chassis frame 1 via rockers 22 and torsion bars 20.

If the car body 61 tilts to the side, i.e. if the car body 61 sways, the tilting forces are transmitted to the chassis frame 1 via the secondary suspension 3, so that the chassis frame 1 is also tilted.

The tilting movement is transmitted from the chassis frame 1 to the fe-der elements 50, whereby they at least partially absorb the tilting movement. The chassis frame 1 is therefore partially supported on the connecting elements 21 by the spring elements 50.

The moment effective in the primary suspension as a result of centrifugal force leads to deflection of the rockers 22 on the side of the chassis outside the curve (here the right-hand side in the figure). On the side on the inside of the curve, there is a corresponding deflection. This inward and outward deflection of the rockers 22 leads to a corresponding rolling motion of the chassis frame 1, since the latter is mounted only at the rocker-side ends of the torsion bars 20. Since in each case one torsion bar 20 is firmly connected to the rocker 22 and the rocker 22 is mounted directly on the wheel axle 25, the torsion bars 20 and wheel axles 25 form a torsionally rigid unit as seen in the direction of travel (cf. FIG. 3). This means that the torsion bars 20 always remain parallel to the wheel axles 25, i.e. parallel to the rail plane, even when the primary suspension springs in and out (cf. FIG. 3). Left-hand and right-hand torsion bars 20 therefore remain parallel to one another and perform up and down movements within the chassis frame 1 under the influence of rolling (shown as dashed lines in the figure). This concept-related characteristic is used to stiffen the primary suspension during roll. In this case, the up and down movement is restricted, or made more difficult, by means of springs 50 between the torsion bar ends and the chassis frame 1. The spring elements 50 are arranged between the center of the connecting element 21 and the inner contour of the chassis frame 1. The spring elements 50 are made of rubber.

FIG. 8 shows a chassis side of a chassis 100 in a plan view and a section through a rocker 22. In a chassis 100, a mirror-inverted arrangement of the elements shown is provided.

On the right side, a wheel 4 is shown in solid lines in the normal track position. The wheel axles are interchangeable. As an alternative to a wheel axle with wheels in the normal gauge position, a wheel axle with a wheel 4' is shown here in dashed lines in a narrow gauge position. For a standard gauge chassis, one motor 10 and one transmission 30 are provided for each wheel 4 in a chassis 100. The two motors 10 of a wheel axle, whose motor axes are aligned, are connected via a clutch 11. The clutch 11 opens depending on the speed and torque load: At low speeds, the clutch 11 is open. At high speeds, the clutch 11 is closed. At larger torque differences between the coupled parts, the clutch 11 can slip.

The torsion bars 20 are mounted in the chassis frame 1 via the elatic bearings 23 and are connected at their end located in the inner area of the chassis 100 by the connecting element 21. The connecting element 21 receives the torsion bars 20 in a rotationally fixed manner. At their other end, the torsion bars are connected in a rotationally fixed manner to the rockers 22.

For driven wheels 4, the rockers 22 each receive the transmission 30. The transmission 30 is connected to the motor 10 via the compensating clutch 31. The purpose of the clutch 31 is to compensate for the offset between the engine axis and the transmission input axis that occurs when the rockers 22 are deflected. The wheels 4 are arranged on the wheel axle 25, which is also the transmission output shaft. The rocker 22 also carries a brake 42. For a chassis 100, one brake 42 is usually arranged on each rocker 22 for each wheel 4 (see FIG. 3). The brake 42 is arranged on the rocker 22 and acts directly on the wheel axle 25. The wheel axle 25 is mounted directly in the rocker 22 by means of wheel bearings 24 and is not further supported relative to the chassis frame 1.

The secondary suspension 3 is also shown schematically in the figure. Seen in the direction of travel, the secondary suspension 3 is arranged in the center of the chassis 100. Two secondary suspension elements 3 are arranged on each side of the chassis.

FIGS. 9a and 9b each show a rail vehicle schematically with chassis 100.

FIG. 9a shows a rail vehicle 60 consisting of three rail vehicle cars 62, each with two bogies 100 and a car body 61. These bogies 100 are designed here as bogies.

FIG. 9b shows a rail vehicle 60 comprising three rail cars 63, each with one chassis 100 and one car body 61. The chassis 100 are not designed to rotate out. Car bodies 64 are arranged between each two rail vehicle cars 63 and are supported by the rail vehicle cars 63.

FIGS. 10a and 10b show a portion of a side view of a chassis with a damping system and schematic view of a damping system. Solid lines show the situation before spring deflection. The deflected position is shown in dashed lines.

FIG. 10a shows a portion of a sectional view through a chassis 100 in the direction of travel. A damping system is shown. The damping system comprises a damping element 13, a portal axle 9, a chassis frame 1 and a transmission element 14.

The portal axle 9 has a side part 15 at one end, which is rotatably mounted on the rocker 22 about the geometric wheel axis V. The portal axle 9 also includes a bridge girder 16 connected to the side part 15.

The damping element 13 is arranged between the chassis frame 1 and the bridge girder 16 and has a substantially horizontal damping direction in the direction of travel. The stroke of the damping element 13 can be varied by the position of the bridge girder 16.

One end of the transmission element 14 is rotatably connected to the chassis frame 1. The other end of the motion transmission element 14 is rotatably connected at the motion transmission point P to the side part 15. The motion transmission point P is arranged at a link distance L from the geometric wheel axle V. The damping connection point Q is arranged at a vertical distance m from the geometric wheel axle V.

When the primary suspension compresses, the chassis frame 1 moves by the vertical frame displacement z. The connection point of the motion transmission element 14 to the chassis frame 1 is displaced by this movement. The motion transmission element 14 in turn transmits this motion to the side part 15, so that the motion transmission point P and thus the side part 15 and the bridge girder 16 are pivoted about the geometric wheel axle V at an angle β. Here, tan β≈z/L applies. The deflection of the bridge girder 16 at the damping connection point Q is approximately u≈m/L*z for small z and thus small β. The deflection of the portal axle 9 is therefore greater than the deflection if the geometry is selected appropriately.

Figure 1:
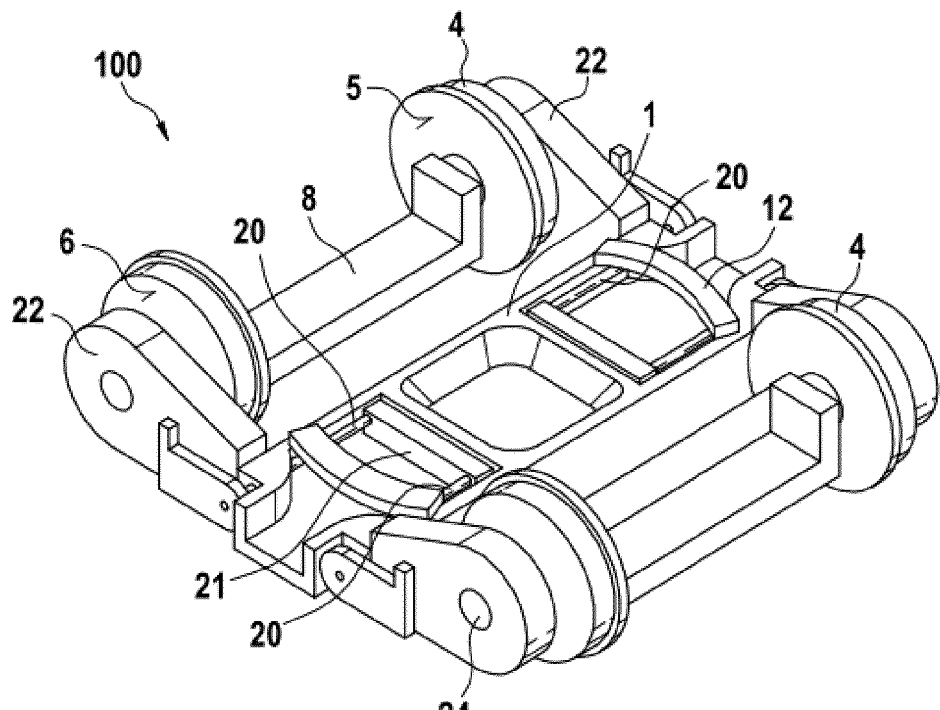
Figure 2:
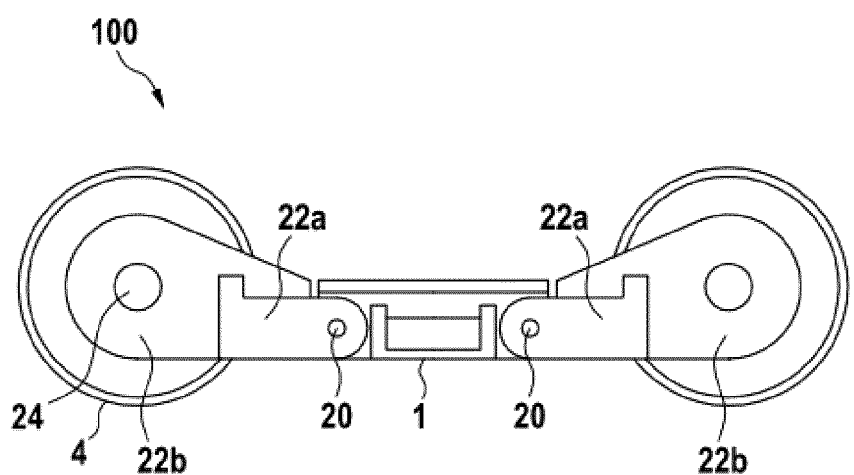
Figure 3:
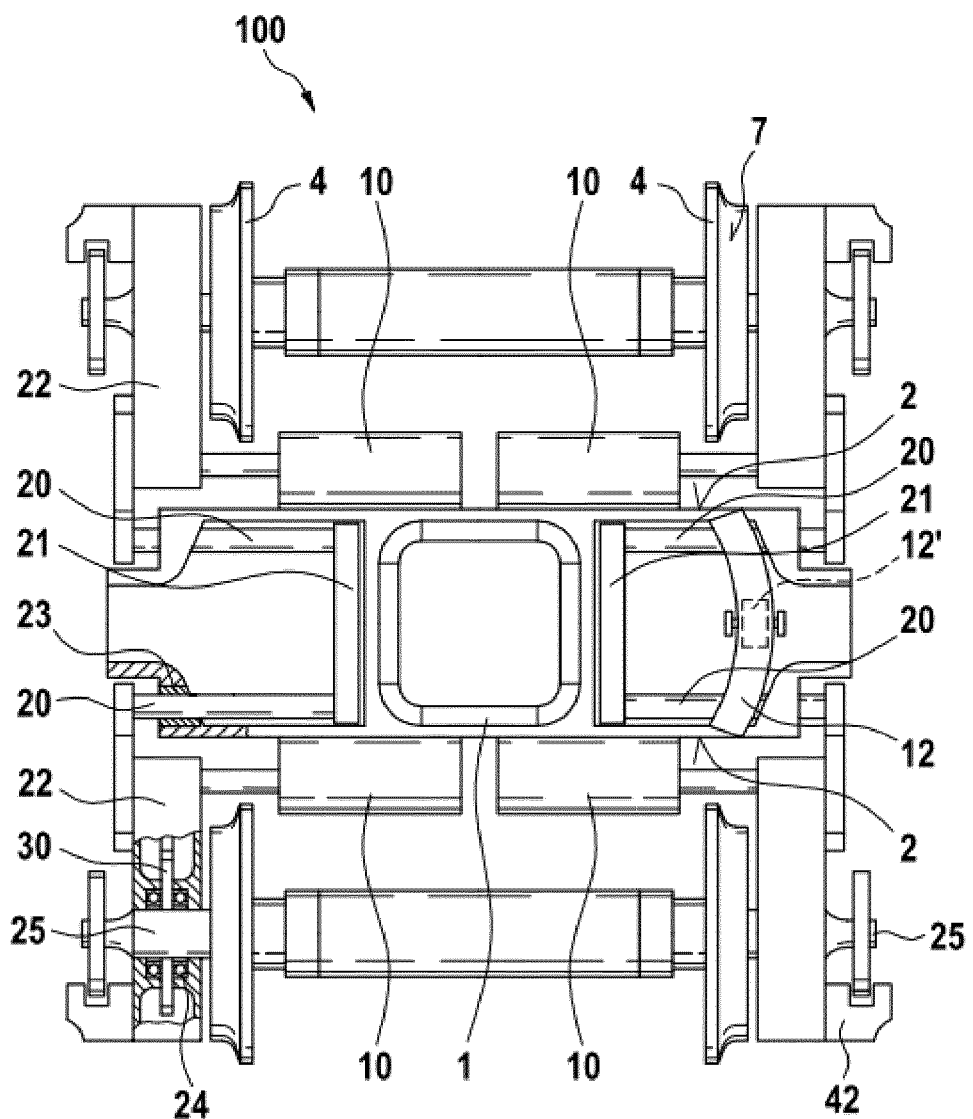
Figure 4:
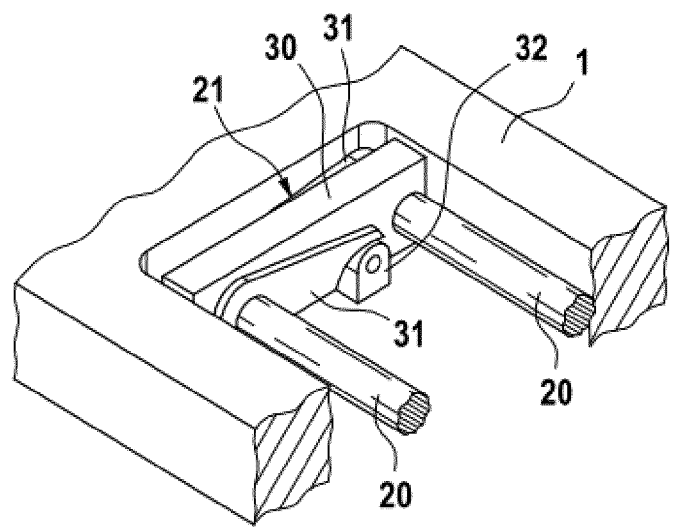
Figure 5:
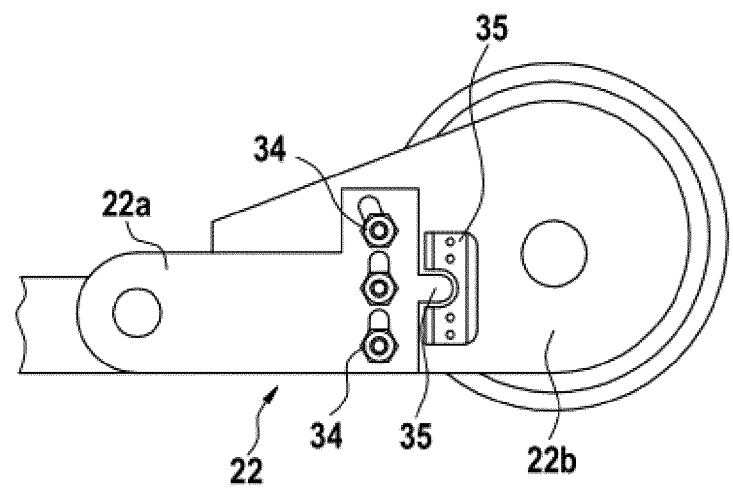
Figure 8:
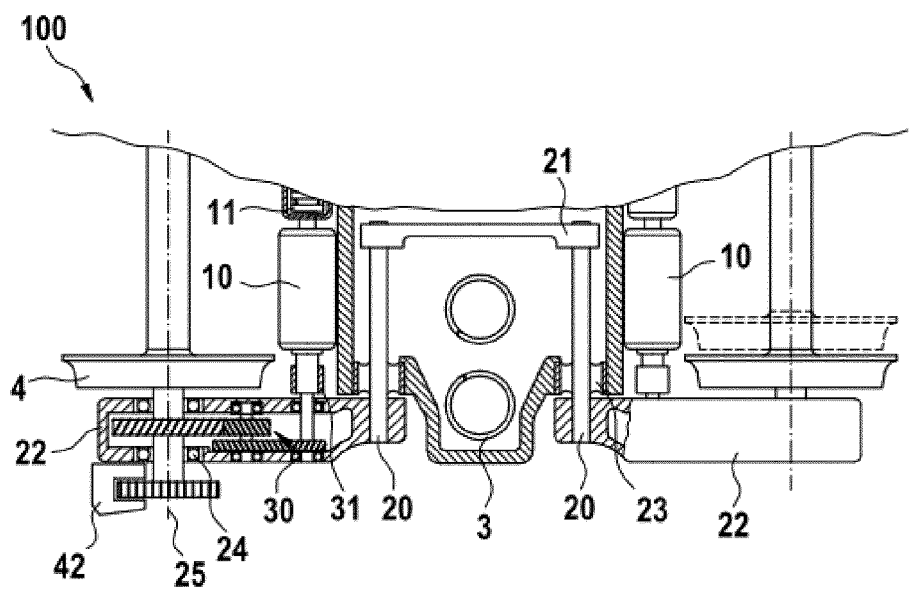
Figure 9A:
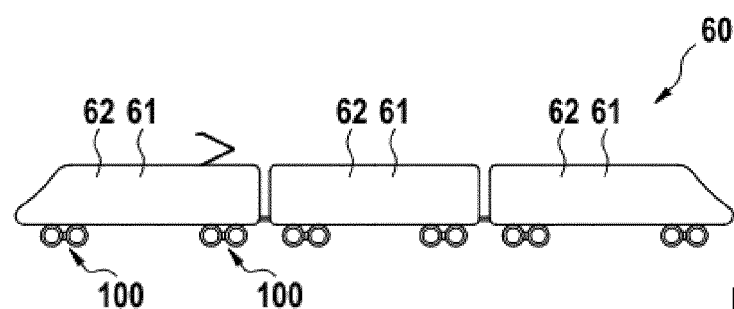
Figure 9B:
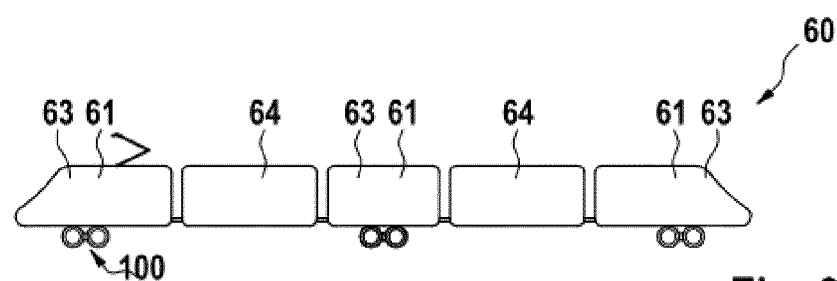
Figure 10A:
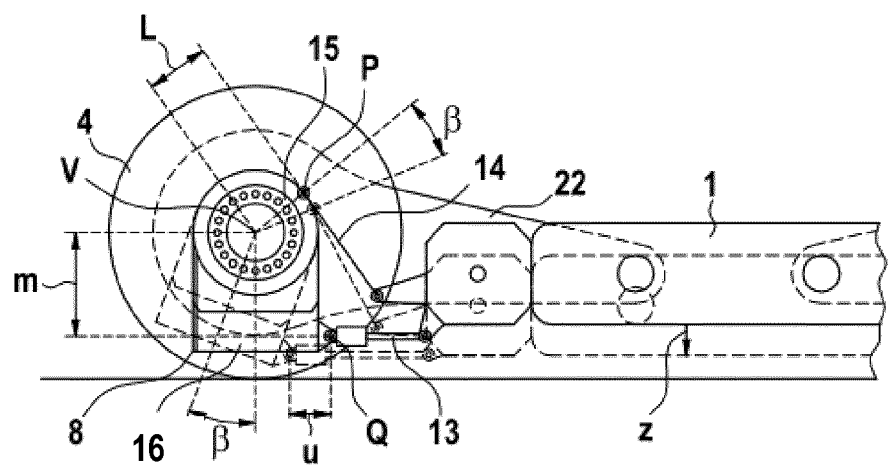
FIG. 10a).
Figure 10B:
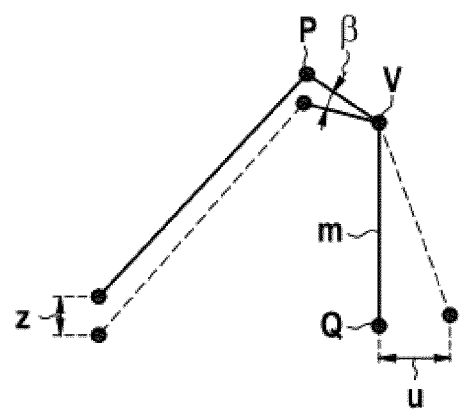
FIG. 10b shows a schematic representation of the pivoting of the portal axle 9 (cf.

The stiffening element 25 is designed here as a hollow beam. The rocker 22 includes an extension element 29 attached to the body of the rocker 22.

The extension element 29 includes a mounting body having a bearing point 29a, and a wedge body 27 having an upper contact point 27a. The attachment body and wedge body 27 are integrally formed. The wedge body 27 has a plan view which comprises a substantially buckled wedge shape.

The stiffening member 25 has a support member 26a and a support element 26b inside. The support member 26a is disposed on the upper side of the stiffening member 25 in the attached state, and the support member 26b is disposed on the lower side.

The support member 26a and the support element 26b each comprise a contact element made of polyurethane. The support member 26a has a thickness of substantially 2 mm, unlike that shown in the figure. The support element 26b, other than as shown in the figure, has a thickness that is substantially 7-9 mm.

In this first loading condition, the stiffening element 25 rests with the support members 26a on the extension element 29. There is a distance between the extension element 29 and the support element 26b.

When the primary suspension is compressed compared to the condition shown in the figure, the extension element 29 rotates about the geometric axis of the support 29a. The end of the wedge body 27 with the lower contact point 27b of the extension element 29 moves downward until it meets the support element 26b. Here, the support element 26b is designed as a polyurethane contact element for both rockers 22 of a chassis side together. If the extension element 29 and thus the rocker 22 rests on the support element 26b, the extension element 29 wedges itself in the stiffening element 25. Thus, stiffening of the primary suspension takes place.

Figure 11:
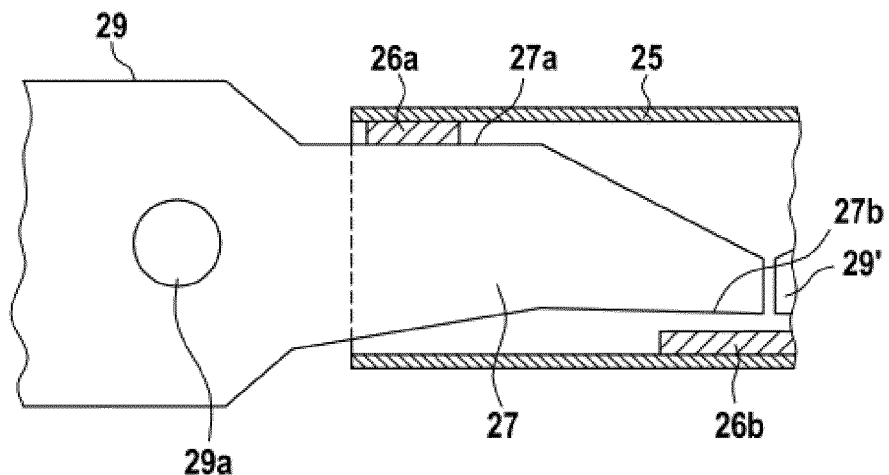
FIG. 11 shows a schematic section through a part of a connection of a rocker 22 with a stiffening element 25 in a first loading condition.

FIGS. 12 each show a section through a stiffening element 25 shown in FIG. 11 in the longitudinal direction. The rockers 22 of one side of the chassis, which are connected via the stiffening element 25, are shown in a first and a second load state.

Figure 12A:
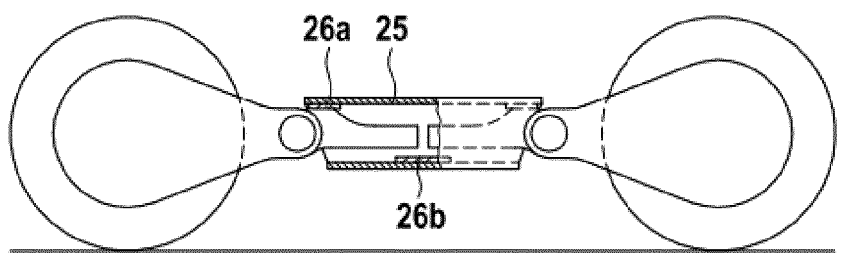

FIG. 12a shows the loading condition already described for FIG. 11.

Figure 12B:
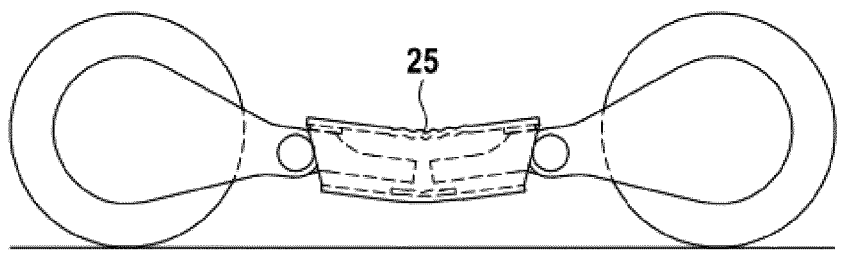

FIG. 12b shows a second loading condition. The load in the second loading condition is greater than the first loading condition.

The rockers 22 are rotated about the geometric axis of the bearing point 29a corresponding to the load from the original position of FIG. 12a. The load shown corresponds to the load prevailing after breakage of a torsion bar of a primary suspension. The extension elements 29 are connected to the stiffening element 25 via the support members 26a and the support element 26b. The stiffening element 25 has been elastically and plastically deformed in accordance with the rotation of the rockers 22.

The invention claimed is:

1. A chassis, for a rail vehicle, comprising:
at least four wheels each comprising a wheel bearing,
at least two wheel axles for suspending the wheels,
a chassis frame, and
a primary suspension for suspending the wheels relative to the chassis frame, and the primary suspension comprises at least four torsion bars each torsion bar being extended along a geometrical bar axis,
wherein the chassis comprises four rockers, and each rocker is mounted on the chassis frame via a respective torsion bar,
wherein the wheel axles are mounted on the rockers via the wheel bearings,
wherein the chassis comprises at least two connecting elements,
in each case two torsion bars are connected, via a connecting element, in such a way that torque from of the torsion bars are counter-rotational.

2. The chassis according claims 1, wherein the torsion bars are movably mounted on the chassis frame.

3. The chassis according to claim 1, wherein the chassis comprises a chassis frame, at least one portal axles and at least one damping system for damping movements between the chassis frame and the wheel axle, the damping system comprises at least one damping element and at least one motion transmission element for transmitting a vertical deflection movement of the chassis frame, the motion transmission element is arranged with one end at a motion transmission point on the portal axle, and the damping element is arranged between the portal axle and the chassis frame and with one end on the portal axle at a damping connection point.

4. The chassis according to claim 1, wherein the chassis comprises at least two support elements for direct connection to a car body.

5. The chassis according to claim 1, wherein the chassis comprises at least two spring elements for roll stiffening.

6. The chassis according to claim 1, wherein the chassis comprises adjusting means for adjusting a distance between the wheel axle and the chassis frame.

7. The chassis according to claim 6, wherein the rockers are designed as two parts and a first part is variable in position relative to a second part, the first part comprises the bearing connected to the chassis frame and the second part comprises the bearing connected to the wheel.

8. The chassis according to claim 6, wherein the position of the torsion bars is adjustable by the adjusting means.

9. The chassis according to claim 1, wherein the chassis comprises at least one motor, and the at least one motor is arranged in the inner region.

10. The chassis according to claim 9, wherein the chassis comprises at least two motors and each of the at least two motors can be connected or are connected to a clutch.

11. The chassis for a rail vehicle, according to claim 1, wherein the chassis comprises at least one magnetic rail brake, and the at least one magnetic rail brake is attached to the rocker.

12. A rail vehicle car, wherein the rail vehicle car comprises a car body and at least one chassis according to claim 1.

13. A rail vehicle, wherein the rail vehicle comprises at least one rail vehicle car according to claim 12.

14. A chassis for a rail vehicle comprising:
a chassis frame,
four wheels each with a wheel bearing, and
four rockers,
wherein at least one rocker connects a wheel axle to a drive axle, the wheels each comprise an inner and an outer side,
the chassis comprises an inner region between the inner sides of the wheels and an outer region outside the inner side of the wheels,
each of the rockers are arranged in the outer region of the chassis, each wheel is mounted, via a wheel axle, in at least one wheel bearing in each case, a wheel bearing is arranged in or on the respective rocker, and at least one wheel bearing is simultaneously the transmission bearing.

15. The chassis according to claim 14, wherein, in each case, the wheels are mounted exclusively via a rocker and a torsion bar.

16. The chassis according to claim 14, wherein the chassis comprises at least one stiffening element, for stiffening against a rotational movement of the rockers, each rocker comprises an extension element for extending the rocker, the extension elements of the rockers of one chassis side is connected or connectable, via a respective stiffening element, so that rotary movements of the rockers, about a geometric wheel axle, can be at least partially sprung, the connection between the stiffening element and the rockers comprising a distance in each case, so that the rotary movements of the rockers about the geometric wheel axles can be sprung by the stiffening element only from a predetermined load on the chassis.

17. The chassis according to claim 16, further comprising at least one transmission, and each transmission is arranged on a respective rocker.

* * * * *